United States Patent [19]

Wagner

[11] Patent Number: 4,856,995

[45] Date of Patent: Aug. 15, 1989

[54] MULTIPLE RESERVOIR NURSING BOTTLE, VALVE ASSEMBLY AND METHOD

[76] Inventor: Eugene Wagner, c/o Dental Concepts, 9 N. Goodwin Ave., Elmsford, N.Y. 10523

[21] Appl. No.: 160,836

[22] Filed: Feb. 26, 1988

[51] Int. Cl.[4] ........................... A61C 5/00; A61J 9/00; A61J 11/04; F16K 51/00

[52] U.S. Cl. ........................................ 433/215; 215/6; 215/11.1; 215/11.3; 215/11.4; 215/11.6; 251/155; 251/156

[58] Field of Search .......................... 215/6, 11.1-11.6; 206/219; 222/144.5; 383/38; 433/215, 80; 251/155, 156; 604/77, 78, 80

[56] References Cited

U.S. PATENT DOCUMENTS

| | | | |
|---|---|---|---|
| 43,154 | 6/1864 | Heneage | 215/6 X |
| 557,352 | 3/1896 | Bender . | |
| 830,001 | 9/1906 | Pitt | 215/6 |
| 2,372,281 | 3/1945 | Jordan | 215/11.1 X |
| 2,431,543 | 11/1947 | Collins | 222/144.5 X |
| 2,745,568 | 5/1956 | Newton | 215/11.4 |
| 2,807,384 | 9/1957 | Lipari . | |
| 2,813,649 | 11/1957 | Lipari . | |
| 2,836,321 | 5/1958 | Soltesz et al. | 215/11.1 |
| 2,931,731 | 4/1960 | Pohjola | 215/11.1 X |
| 3,197,071 | 7/1965 | Kuster | 215/6 X |
| 3,211,315 | 10/1965 | Griesinger | 215/11.1 |
| 3,876,112 | 4/1975 | Kramer | 222/144.5 X |
| 4,603,784 | 8/1986 | Chang | 215/6 X |

*Primary Examiner*—Sue A. Weaver
*Attorney, Agent, or Firm*—Natter & Natter

[57] ABSTRACT

A nursing bottle includes a pair of reservoirs which are selectively coupleable to a single nipple. The bottle includes a hollow body, an intermediate ring having a valve disk with two apertures and a nipple carrier having a valve plate with a single aperture. The nipple carrier is mounted over the intermediate ring and rotates to selectively connect the valve plate aperture with either of the valve disk apertures. A separate sack or flexible bag type liquid reservor is connected to each of the valve disk apertures. A conventional bag reservoir may optionally be fitted in the hollow body with the nipple carrier then being engaged directly over the body. In an alternate embodiment, the body may comprise a rigid walled bottle with a longitudinal partition forming two reservoirs. The nipple carrier and valve plate are engaged over the rigid walled bottle and are rotated to register the valve plate aperture with either reservoir. A method of reducing the risk of tooth decay while using the bottle for pacification purposes includes filling one of the reservoirs with a sugar containing liquid and the other reservoir with a sugar free liqid. The nipple is interconnected to the sugar containing liquid and the child is permitted to relax while drinking the sugar containing liquid. Thereafter, the nipple is connected to the sugar free liquid prior to cessation of sucking to rinse the sugars from the child's oral cavity.

17 Claims, 4 Drawing Sheets

FIG. 4
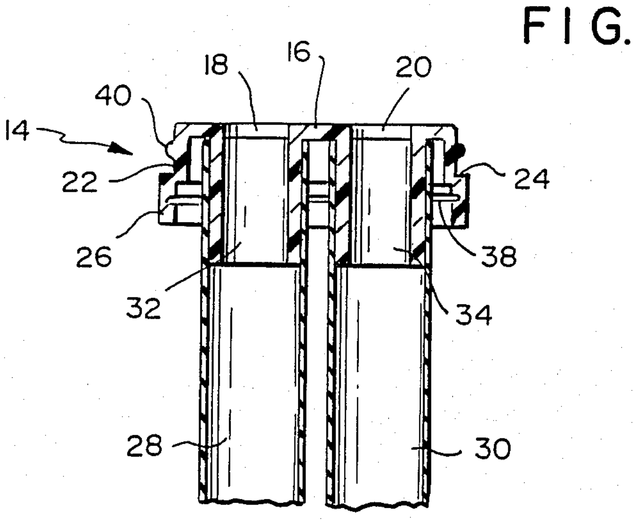
FIG. 6
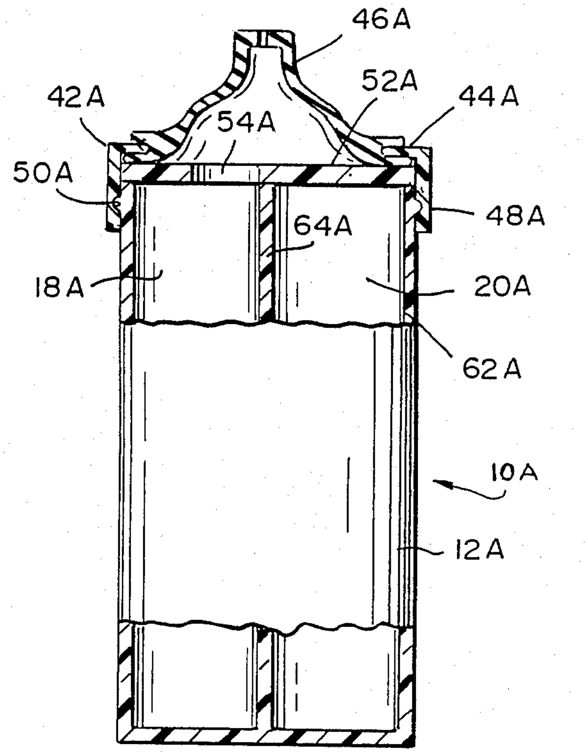
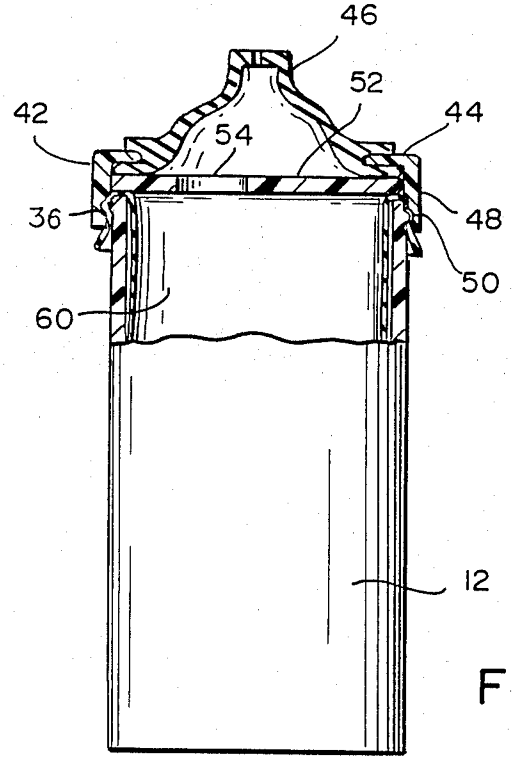
FIG. 5

MULTIPLE RESERVOIR NURSING BOTTLE, VALVE ASSEMBLY AND METHOD

BACKGROUND OF THE INVENTION

1. Field of the Invention

The invention relates generally to nursing bottles and more particularly to bottles capable of reducing the risk of tooth decay.

2. Related Art

The nursing bottle has provided a source of nutrients in the early developmental stages of children for many generations. Parents have employed nursing bottles for feeding youngsters not only formula but, in addition, other liquids some of which had nutritional value. Examples of liquids which have been fed to children through nursing bottles to satisfy taste cravings of children include milk, fruit juice, sugar water, sweetened gelatin, soft drinks, and other sweetened liquids.

Unfortunately, the usage of nursing bottles has resulted in a condition known as nursing bottle mouth which has been increasingly prevalent in children of all socio-economic ranges. Such condition of advanced tooth decay has been attributed to frequent exposure of childrens' teeth for extended periods of time to liquids containing sugars, e.g. fructose and sucrose. The sugars in commonly fed liquids were utilized by plaque bacteria to produce tooth enamel attacking acids which often produced dental caries.

It has been determined that the frequency and length of duration of exposure of a child's teeth to sugars was a risk factor which affected tooth decay. Dental practitioners and associations recommended that children should not be offered bottles of liquids having sugars on a frequent basis or nonnutritive basis as, for example, for pacification. In addition, parents have been admonished against permitting children to fall asleep sucking on a bottle. On such occasions, once the child fell asleep, the natural flow of saliva decreased and the sugar containing liquids were allowed to collect around the teeth for long periods, which has been known to result in excessive decay.

Unfortunately, due to the circumstances of child rearing, parents have often found no alternative than to satisfy a cranky child's sucking desires with a bottle in order to put the child to sleep. In these instances, children have often rejected plain water, preferring sweet liquids.

SUMMARY OF THE INVENTION

In compendium, the invention comprises a nursing bottle which includes a pair of liquid reservoirs, one of which is filled with milk, formula or other tasty sweet liquid and the other of which is filled with water or other sugar free noncariogenic liquid. When a child is given the bottle at bedtime or prior to napping, the nipple is connected to the reservoir containing the sweet liquid. As the child begins to dose, the parent manipulates a valve to interconnect the nipple with the second reservoir, containing the water. Continued sucking by the child then flushes the sugars carried in the tasty liquid and reduces the tendency for the formation of tooth decaying acids.

The structure of the bottle includes a hollow shell or body the upper end of which is connectable to an intermediate ring having a valve disk with two apertures. A separate sack or bag type liquid reservoir is connected to each of the valve disk apertures and is filled with a suitable drinking liquid, at least one of which is sugar free. A nipple carrier is mounted atop the intermediate ring. The nipple carrier includes a valve plate having a single opening which is selectively registrable with either of the apertures in the valve disk when the nipple carrier is rotated relative to the intermediate ring.

The bottle may be employed as a conventional single reservoir bottle by utilizing a conventional sack or bag type liquid reservoir which is inserted into the hollow body. Thereafter, the nipple carrier may be mounted directly over a hollow body and the single reservoir is directly connected to the nipple.

In an alternate embodiment, the hollow body includes a closed bottom and a rigid walled partition which provides two reservoirs. The nipple carrier is directly mounted over the cap of the body and when rotated, the valve plate will selectively interconnect the nipple with either reservoir.

A further embodiment provides for a slidable valve plug which serves to interconnect the nipple with either reservoir.

From the foregoing summary, it will be appreciated that it is an aspect of the present invention to provide a nursing bottle of the general character described which is not subject to the disadvantages of the related art aforementioned.

It is a further aspect of the present invention to provide a nursing bottle of the general character described which permits selective coupling of different liquids to a single nipple.

A consideration of the present invention is to provide a nursing bottle of the general character described whereby a parent may reduce the risk of tooth decay by precluding the collection of sugars in a sleeping child's mouth.

It is a feature of the present invention to provide a nursing bottle of the general character described which will constitute an effective instrumentality in a program for preventing tooth decay in children.

Yet another aspect of the present invention is to provide a nursing bottle of the general character described which enables a parent to flush sugars from a childs'-mouth to thereby reduce decay promoting conditions.

A still further consideration of the present invention is to provide a nursing bottle of the general character described which is simple in construction and suitable for low cost mass production fabrication techniques.

A still further aspect of the present invention is to provide a nursing bottle of the general character described which is readily adaptable for use in feeding with conventional bag type liquid reservoirs while providing the ability to utilize multiple reservoirs.

A still further feature of the present invention is to provide a nursing bottle of the general character described which permits a parent to utilize a nursing bottle for pacification without increasing the likelihood of tooth decay.

Other aspects, features and considerations of the present invention in part will be obvious and in part will be pointed out hereinafter.

With these ends in view, the invention finds embodiment in certain combination of elements, arrangements of parts and series of steps by which the aspects, features and considerations aforementioned and certain other aspects, features and considerations are hereinafter attained, all as fully described with reference to the accompanying drawings in the scope of which is more particularly pointed out and indicated in the appended claims.

BRIEF DESCRIPTION OF THE DRAWINGS

In the accompanying drawings, in which are shown some of the various possible exemplary embodiments of the invention.

FIG. 4 is a fragmentary sectional view through the intermediate ring, the same being taken substantially along the plane 4—4 of FIG. 3;

FIG. 5 is a fragmentary sectional view through the nursing bottle, similar to the view of FIG. 2 where, however, the intermediate ring is not utilized and a single bag reservoir is carried in the shell;

FIG. 6 is a fragmentary longitudinal sectional view through an alternate embodiment of the invention wherein separate liquid reservoirs are formed in the body and the intermediate ring is not employed;

DESCRIPTION OF THE PREFERRED EMBODIMENT

Figure 1:
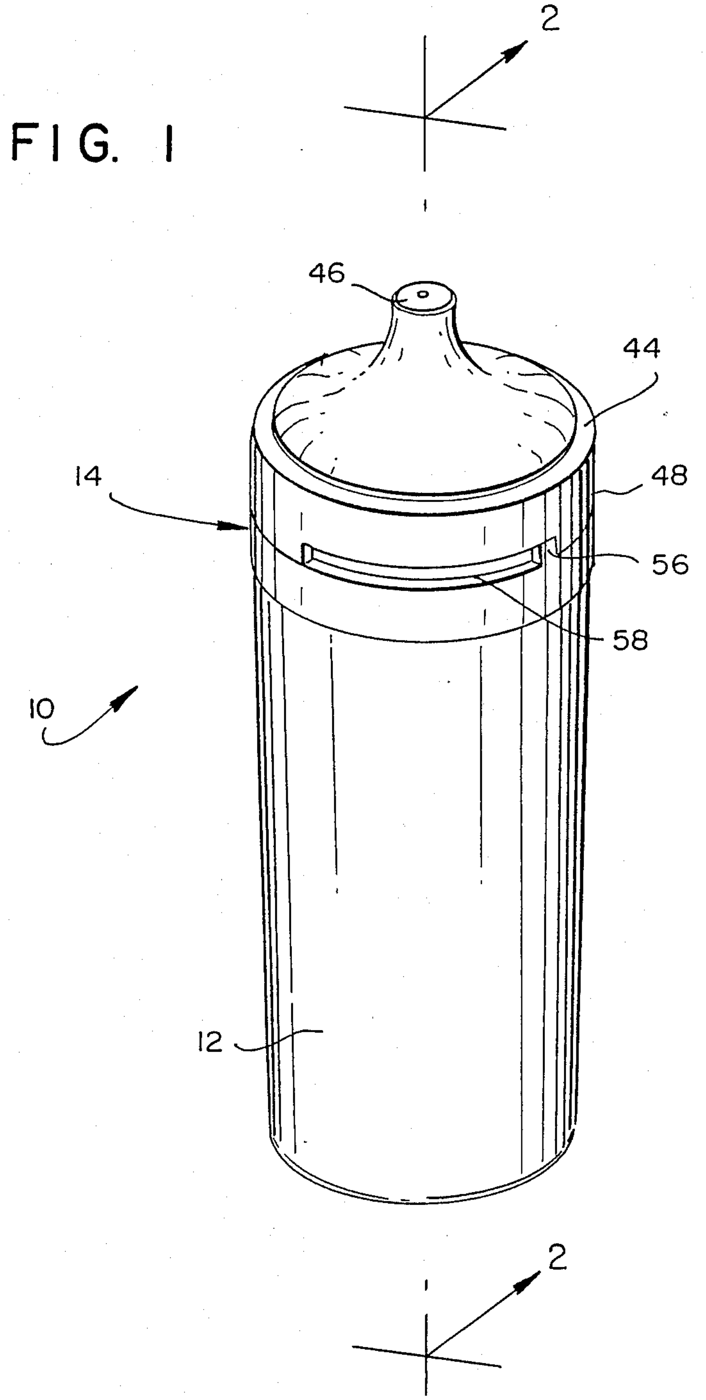
FIG. 1 is a perspective illustration of a multiple reservoir nursing bottle constructed in accordance with and embodying the present invention.

Referring now in detail to the drawings, the reference numeral 10 denotes generally a multiple reservoir nursing bottle constructed in accordance with and embodying the invention. The bottle 10 includes a generally cylindrical open ended hollow shell 12.

An intermediate ring 14 is selectively coupleable to the upper end of the shell 12. The top of the ring 14 comprises a generally planar circular valve disk 16 having a pair of apertures 18, 20. From the periphery of the disk 16, a cylindrical flange 22 extends downwardly. At the lower end of the flange 22, an annular shoulder 24 projects radially outward to a depending cylindrical skirt 26.

A pair of flexible bag or sac liquid reservoirs 28, 30 are each connected to one of the valve disk apertures through a depending cylindrical neck 32, 34. The flexible bag reservoirs 28, 30 are made of suitable material commonly employed for nursing bottle applications such as polyethylene and may be stretched at their open ends and pulled over the necks 32, 34.

A snap fit coupling is provided between the shell 12 and the ring 14 through an annular bead 36, which is formed on the outside of the shell, and a mating groove 38, formed on the inside of the skirt 26.

It should be noted that the cylindrical flange 22 also includes an annular bead 40 which is employed to provide a snap fit coupling between the intermediate ring and a nipple carrier 42. The carrier 42 includes a top surface 44 having a central aperture through which a conventional nipple 46 is mounted. From the periphery of the top 44, the carrier includes a depending annular skirt 48, the inner surface of which includes a groove 50 which mates with the flange bead 40 to provide the snap fit.

Figure 2:
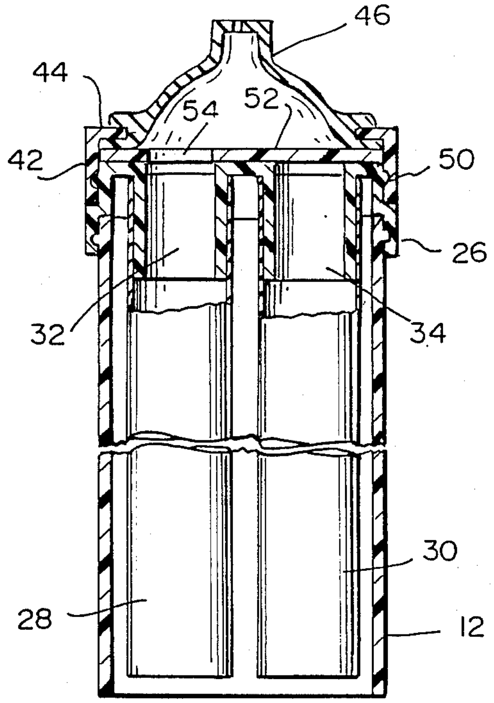
FIG. 2 is a fragmentary sectional view through the nursing bottle, the same being taken substantially along the plane 2—2 of FIG. 1 and illustrating a pair of flexible bag reservoirs connected to apertures in a valve disk and with one of the apertures in registration with an aperture in a valve plate associated with a nipple carrier.
Figure 3:
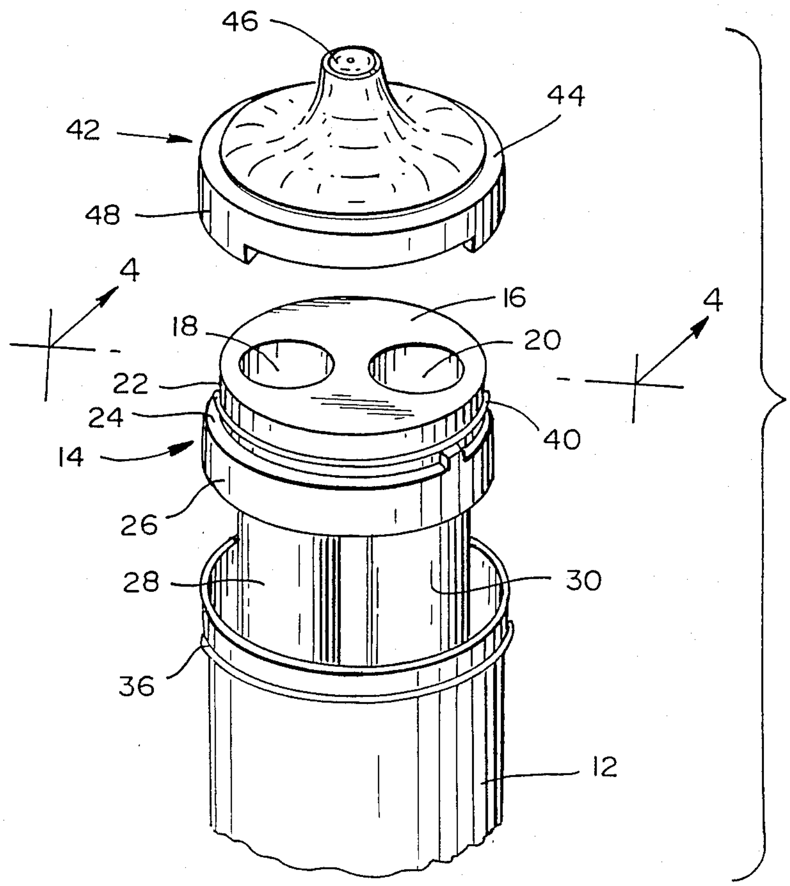
FIG. 3 is a perspective exploded view of the nursing bottle showing the nipple carrier, an intermediate ring which includes the valve disk, the pair of reservoirs depending from the intermediate ring and a shell or body.

Within the carrier 42 and positioned in abutting relationship with the underside of the nipple 46, is a circular valve plate 52, illustrated in FIG. 2. The valve plate 52 includes a single asymmetrical aperture 54.

It should be appreciated that the snap fit engagement between the intermediate ring and the nipple carrier permits rotation of the nipple carrier, hence the valve plate 52, relative to the intermediate ring and its valve disk. Such rotation is limited by engagement between a lug 56 which projects upwardly from the shoulder 24 of the intermediate ring and extends into a notch 58 which is cut into the carrier skirt 48. At each of the extremes of permitted rotation of the nipple carrier relative to the ring 14, the valve plate aperture 54 will be registered with one or the other of the valve disk apertures 18, 20. Thus, by rotation of the nipple carrier 42 relative to the intermediate ring, either of the two reservoirs 28, 30 and the different liquids carried in each, is fluid coupled to the nipple 46.

With attention now directed to FIG. 5, it will be appreciated that the shell 12 is of conventional nursing bottle size and the nursing bottle 10 may be used, on an optional basis, as a conventional nursing bottle having only a single flexible bag reservoir such as a conventional flexible bag reservoir 60. In such instance, the reservoir 60 is inserted into the shell 12 and the wall of the reservoir adjacent its open end is folded downwardly around the upper edge of the shell 12. Thereafter, the nipple carrier 42 is snap fitted over the top of the shell 12.

The groove 50, formed on the inside of the nipple carrier skirt 48, engages the bead 36 of the shell 12 with the film of the flexible bag reservoir therebetween to provide a liquid tight seal. In addition, the valve plate 52 serves to seal the reservoir 60. Naturally, formula, milk or other liquid carried in the reservoir 60 will flow through the valve plate aperture 54 and the nipple 46.

Figure 7:
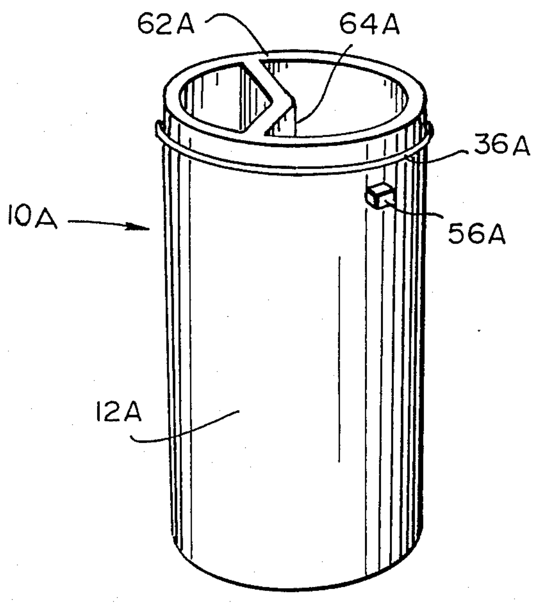
FIG. 7 is a perspective illustration of the bottle body of the FIG. 6 embodiment showing a rigid walled partition which forms the separate reservoirs.

In FIGS. 6 and 7 a further embodiment of the invention is disclosed wherein flexible bag reservoirs are not employed. Referring now to such figures, wherein like numerals are employed to designate components corresponding to those described in the prior embodiment bearing, however, the suffix A, it will be seen that a nursing bottle 10A includes a shell 12A having an open top and a closed bottom.

The shell 12A is formed with a substantially rigid outer wall 62A molded of a suitable thermoplastic. A rigid inner partition wall 64A extends unitarily across and joins two portions of the inner surface of the wall 62A. The partition 64A serves to separate the shell 12A into two separate reservoirs 18A, 20A.

It should be noted that the upper surface of the shell 12A is preferable smooth and planar to provide an appropriate valve sealing surface. As with the prior embodiment, an upper bead 36A is formed along the outer wall 62A adjacent the top of the shell. The shell 12A is directly coupled to a nipple carrier 42A which is substantially identical to the carrier 42 of the prior embodiment. The carrier 42A includes a top surface 44A having a central aperture. From the periphery of the top 44A, the carrier includes a depending annular skirt 48A, the inner surface of which includes a groove 50A, in a manner identical with that of the carrier 42 of the prior embodiment.

The carrier 42A includes a valve plate 52A identical to the prior valve plate 52. The valve plate 52A includes an aperture 54A. Rotation of the carrier 42A relative to the shell 12A results in selective coupling of a nipple 46A with either reservoir 18A, 20A through the aperture 54A. Limit stops for such rotation are provided by a lug 56A which projects radially from the shell wall 62A and engages a notch in the nipple carrier skirt.

Figure 8:
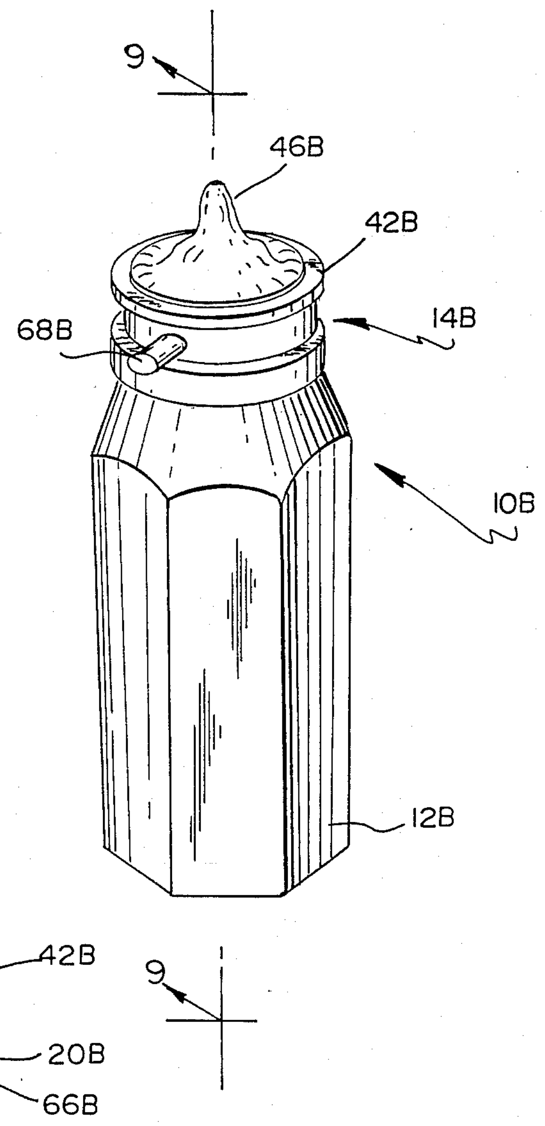
FIG. 8 is a perspective illustration of a further embodiment of the invention wherein an alternate valve arrangement includes a slidable plug.
Figure 9:
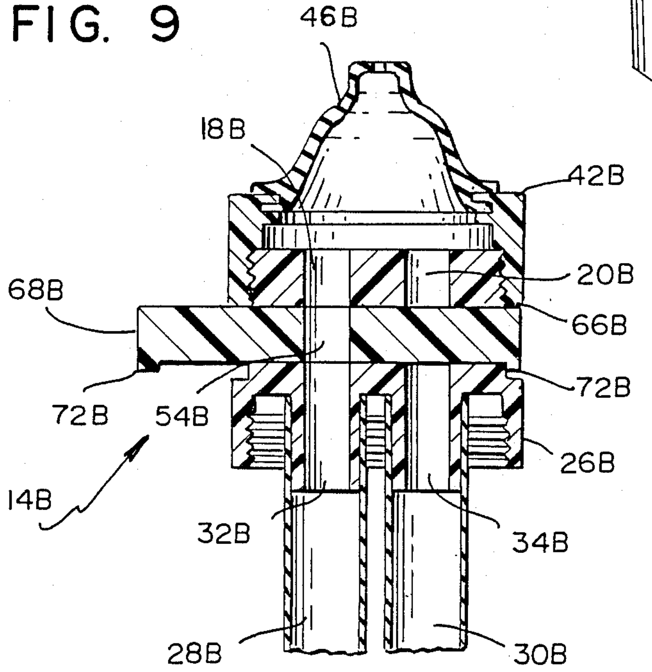
FIG. 9 is an enlarged scale fragmentary longitudinal sectional view through the nursing bottle, the same being taken substantially along the plane 9—9 of FIG. 8 with the bottle body omitted.

In a further embodiment of the invention illustrated in FIGS. 8 and 9, an alternate valve arrangement is provided for interconnecting a nipple with a pair of reservoirs. In the description of such embodiment, like numerals will be employed to designate components corresponding to those of the prior embodiments, however, bearing the suffix B. A nursing bottle 10B includes an outer body or shell 12B which carries threads adjacent its upper open end. The threads and the open top of the shell 12B are configured in conformity with the dimensions of conventionally employed standard nursing bottles.

An intermediate valve assembly 14B is provided to selectively couple a conventional nipple carrier 42B to either of two liquid reservoirs, 28B, 30B. The liquid reservoirs 28B, 30B are illustrated in FIG. 9 as comprising flexible bag reservoirs which are coupled to a pair of passageways 18B, 20B which extend vertically through the body of the intermediate valve assembly 14B. The flexible bags 28B, 30B are joined to the passageways 18B, 20B through a pair of depending necks 32B, 34B in a manner identical to that of the first described embodiment.

It should be appreciated that the intermediate valve assembly 14B also includes an annular skirt 26B having internal threads which mate with the external threads provided on the bottle shell 12B. At the upper end of the intermediate valve assembly 14B, external threads are provided for mating with internal threads of the conventional nipple carrier, 42B.

In order to selectively couple a nipple 46B with either of the reservoirs 28B, 30B, a transverse bore 66B is provided through the body of the intermediate valve assembly and intersecting each of the passageways 18B, 20B. It should be appreciated that the bore 66B is of larger diameter than the passageways 18B, 20B.

Fitted within the bore 66B is a slidable cylindrical plug 68B having a single aperture 54B. The plug 68B may be suitably keyed with the bore 66B to prevent rotation. In the plug position illustrated in FIG. 9, the reservoir 28B and the passageway 18B are through connected to the nipple 46B. In order to uncouple the reservoir 28B and couple the reservoir 30B, the plug is merely pushed inwardly until an abutment stop 72B contacts the intermediate valve assembly at which point the aperture 54B will be registered with the passageway 20B.

It should also be appreciated that in a manner similar to the first embodiment, the bottle shell 12B may be employed with the nipple carrier 42B for a single reservoir application either by utilizing a flexible bag or by utilizing a closed bottomed bottle shell.

In accordance with the invention, a parent or other person charged with responsibility for a child will, if necessary, fill one of the reservoirs with milk or other sugar carrying tasty liquid and the other reservoir with a sugar free liquid, possibly fluoridated water.

When the child desires the sweet liquid, the valve plate aperture 54 is registered with the valve disk aperture 18, 20 corresponding to the reservoir having the desired liquid. Generally, children hold their nursing bottles while nourishing and, in addition, while dosing. Pursuant to the invention, in order to reduce the risk of tooth decay, the supervisory adult will, upon noticing the child beginning to dose, or sooner if permitted by the child, rotate the nipple carrier 42 to register the valve plate aperture 54 with the other valve disk aperture and thus provide a supply of sugar free liquid which passes through the nipple and into the child's oral cavity. The sugar free liquid serves to flush the sugars from the child's mouth and reduce the risk of tooth decay.

When utilizing the embodiment of FIGS. 6 and 7, the intermediate ring is not used and the valve plate aperture 54A is in direct communication with each of the reservoirs 18A, 20A. Rotation of the nipple carrier will directly couple the nipple with either of the reservoirs. In conjunction with the embodiment of FIGS. 8 and 9, the supervisory adult need only press the plug 68B inwardly toward the intermediate valve assembly 14B to switch reservoirs.

Thus it will be seen that there is provided a multiple reservoir nursing bottle which achieves the various aspects, considerations and features of the present invention and which is well suited to meet the conditions of practical usage.

As various possible embodiments might be made at the present invention, and as various changes might be made in the exemplary embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. A nursing bottle suitable for use in a program of prophylaxis against tooth decay, the bottle comprising a bottle body including a plurality of reservoir means for carrying different liquids, nipple means for providing a liquid conduit into a child's oral cavity and valve means interconnecting the reservoir means with the nipple means, the valve means for selectively coupling the nipple means in fluid communication with each of the reservoir means whereby liquid carried in one of the reservoir means can be substituted for liquid carried in another reservoir means without removing the nipple means from a child's oral cavity.

2. A multiple reservoir nursing bottle constructed in accordance with claim 1 wherein the valve means includes a valve plate, means forming an aperture in the valve plate and means for moving the valve plate aperture relative to each of the reservoirs.

3. A multiple reservoir nursing bottle constructed in accordance with claim 2 wherein the means for moving the valve plate aperture comprises means for rotating the valve plate.

4. A multiple reservoir nursing bottle constructed in accordance with claim 3 wherein the valve means includes an intermediate ring, the ring including a valve disk having a plurality of apertures, each aperture corresponding to one of the reservoirs, the valve plate being in abutment against the disk and being rotatable for registration of the valve plate aperture with each of the disk apertures.

5. A multiple reservoir nursing bottle constructed in accordance with claim 4 wherein each of the reservoirs comprises a flexible bag, the valve means including means interconnecting each reservoir to one of the disk apertures.

6. A multiple reservoir nursing bottle constructed in accordance with claim 5 wherein the means interconnecting each reservoir to one of the valve disk apertures comprises a neck extending downwardly from the disk at each aperture.

7. A multiple reservoir nursing bottle constructed in accordance with claim 4 wherein the nipple means includes a nipple and a nipple carrier, the nipple being mounted to the carrier, the nipple carrier including the valve plate, and means mounting the nipple carrier to the intermediate ring for rotation relative to the ring.

8. A multiple reservoir nursing bottle constructed in accordance with claim 2 wherein the nipple means includes a nipple and a nipple carrier, means mounting the nipple to the carrier, the carrier including the valve plate, the bottle further including an outer wall and an interior partition wall, the outer wall and the partition wall comprising means forming the plurality of reservoir means, the bottle further including means rotatably mounting the nipple carrier to the upper end of the bottle body.

9. A multiple reservoir nursing bottle constructed in accordance with claim 7 wherein the means mounting the nipple carrier to the intermediate ring for rotation comprises means forming a groove in one of the components and means forming a mating bead in the other.

10. A nursing bottle constructed in accordance with claim 1 wherein the bottle includes an outer shell, the shell being so dimensioned so as to accommodate a conventional bottle liner and means for securing a nipple carrier directly to the shell.

11. A multiple reservoir nursing bottle constructed in accordance with claim 1 wherein the valve means comprises means forming a passageway for interconnecting each of the reservoir means with the nipple means and slidable plug means for selectively interconnecting each of the passageways with the nipple means.

12. A multiple reservoir nursing bottle, the bottle comprising a plurality of reservoirs for carrying liquids, a nipple, and a valve assembly interconnecting the reservoirs and the nipple, the valve assembly including a passageway associated with each of the reservoirs and a valve plug means and means for selectively moving the valve plug means to open one of the passageways while blocking the remaining passageways.

13. A multiple reservoir nursing bottle constructed in accordance with claim 12 wherein the valve assembly includes a body, the passageways extending substantially parallel to one another through the body, means forming a bore through the body, the bore being dimensioned larger than the passageways and extending in a direction transverse to the passageways, the valve plug means being slidably received in the bore and means forming an aperture through the valve plug means, the aperture being selectively registered with any one of the passageways while the remainder of the plug means seals the remaining passageways.

14. A method of reducing the risk of tooth decay in children who drink with nursing bottles, the method comprising the steps of:

(a) obtaining a multiple reservoir nursing bottle constructed in accordance with claim 1;
(b) loading one of the reservoirs with a sweet tasty liquid and loading at least one other reservoir with a sugar free liquid;
(c) actuating the valve means to interconnect the nipple means with the one reservoir;
(d) feeding the child with the bottle;
(e) observing the child to determine a state of pacification;
(f) actuating the valve means to interconnect the other reservoir with the nipple means when the state of pacification has been attained and prior to cessation of the sucking action of the child;

whereby the sugar free liquid will flush sugars from the child's mouth.

15. A method of reducing the risk of tooth decay in children while at the same time using a nursing bottle for pacification purposes, the method comprising the steps of:

(a) providing a nursing bottle with a plurality of liquid reservoirs;
(b) filling one of the reservoirs with a tasty liquid containing sugar and at least one other reservoir with a sugar free liquid;
(c) providing means for selectively interconnecting each reservoir with a single nipple;
(d) interconnecting the nipple with the reservoir containing the tasty liquid and feeding the child the tasty liquid through the bottle;
(e) permitting the child to attain a calm and relaxed state while sucking on the nipple;
(f) disconnecting the reservoir containing the tasty liquid from the nipple and connecting the reservoir containing the sugar free liquid to the nipple prior to the cessation of sucking by the child.

16. A method of reducing the risk of tooth decay in children in accordance with claim 15 wherein the other reservoir is loaded with a fluoridated sugar free liquid.

17. A valve mechanism for a multiple reservoir nursing bottle system, the valve mechanism including means for accessing a pair of liquid reservoirs, means providing a liquid passageway from each reservoir to a nipple and means for selectively opening one passageway while blocking the other passageway, the valve mechanism further including means for interconnection with a bottle body adjacent the upstream end of each passageway and means for interconnection to a nipple adjacent the downstream end of each passageway.

* * * * *